United States Patent
Morioka

(10) Patent No.: US 8,964,642 B2
(45) Date of Patent: Feb. 24, 2015

(54) COMMUNICATION APPARATUS, COMMUNICATION CONTROL METHOD, AND COMMUNICATION SYSTEM

(75) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 13/579,039

(22) PCT Filed: Jan. 26, 2011

(86) PCT No.: PCT/JP2011/051443
§ 371 (c)(1),
(2), (4) Date: Aug. 15, 2012

(87) PCT Pub. No.: WO2011/111429
PCT Pub. Date: Sep. 15, 2011

(65) Prior Publication Data
US 2012/0307738 A1   Dec. 6, 2012

(30) Foreign Application Priority Data

Mar. 11, 2010  (JP) .................................. 2010-054935

(51) Int. Cl.
*H04W 4/00*    (2009.01)
*H04B 7/00*    (2006.01)
(Continued)

(52) U.S. Cl.
CPC ............ *H04B 7/086* (2013.01); *H04B 17/0047* (2013.01); *H04W 88/06* (2013.01); *H04B 17/0072* (2013.01)
USPC ........... 370/328; 370/329; 370/338; 370/347; 455/567; 342/367; 342/368

(58) Field of Classification Search
CPC ........... H04B 17/0047; H04B 17/0072; H04B 7/086; H04W 88/06
USPC .......... 370/310, 328, 338, 329, 318; 455/524, 455/525, 73, 562.1, 91, 130, 509, 68, 567; 342/367, 368; 375/299
See application file for complete search history.

(56) References Cited

U.S. PATENT DOCUMENTS 6,507,600 B2 *   1/2003   Schilling ...................... 375/134
2003/0048770 A1 *   3/2003   Proctor, Jr. .................... 370/349
(Continued)

FOREIGN PATENT DOCUMENTS

JP   2000-307494   11/2000
JP   2004-15800    1/2004
(Continued)

OTHER PUBLICATIONS

Office Action issued Apr. 2, 2013, in Japanese Patent Application No. 2010-054935.
(Continued)

*Primary Examiner* — Andrew Lai
*Assistant Examiner* — Mahmudul Hasan
(74) *Attorney, Agent, or Firm* — Oblon, Spivak, McClelland, Maier & Neustadt, L.L.P.

(57) ABSTRACT

Provided is a communication apparatus including a first wireless communication part capable of performing wireless communication according to a first communication scheme and a second wireless communication part capable of performing wireless communication according to a second communication scheme that uses a higher frequency band than the first communication scheme, wherein the second wireless communication part determines a reception timing to receive a beacon transmitted according to the second communication scheme based on a time when a predetermined control signal has been received by the first wireless communication part, and forms, at the determined reception timing, a reception beam having a directionality learned in advance.

6 Claims, 10 Drawing Sheets

(51) Int. Cl.
*H04B 7/08* (2006.01)
*H04B 17/00* (2006.01)
*H04W 88/06* (2009.01)

(56) References Cited

U.S. PATENT DOCUMENTS

| | | | |
|---|---|---|---|
| 2003/0228857 A1 | 12/2003 | Maeki | |
| 2004/0196822 A1* | 10/2004 | Proctor, Jr. | 370/349 |
| 2005/0185628 A1* | 8/2005 | Watanabe et al. | 370/347 |
| 2006/0056378 A1* | 3/2006 | Sugaya | 370/347 |
| 2008/0026797 A1* | 1/2008 | Nanda et al. | 455/562.1 |
| 2008/0109711 A1* | 5/2008 | Morioka et al. | 714/807 |
| 2008/0129881 A1* | 6/2008 | Shao et al. | 348/723 |
| 2008/0130596 A1* | 6/2008 | Kalhan | 370/338 |
| 2008/0153553 A1* | 6/2008 | Horiguchi et al. | 455/567 |
| 2008/0298341 A1* | 12/2008 | Fujiwara et al. | 370/350 |
| 2009/0097440 A1* | 4/2009 | Sakoda | 370/328 |
| 2009/0160707 A1* | 6/2009 | Lakkis | 342/367 |
| 2009/0279523 A1* | 11/2009 | Doi et al. | 370/338 |
| 2010/0210221 A1* | 8/2010 | Takano et al. | 455/68 |

FOREIGN PATENT DOCUMENTS

| | | |
|---|---|---|
| JP | 2008-48119 | 2/2008 |
| JP | 2008-235961 | 10/2008 |

OTHER PUBLICATIONS

International Search Report issued Apr. 26, 2011 in Application No. PCT/JP2011/051443.
Office Action issued Jun. 5, 2014, in Chinese Patent Application No. 2014-053001017740 with English-language Translation.

* cited by examiner

US 8,964,642 B2

COMMUNICATION APPARATUS, COMMUNICATION CONTROL METHOD, AND COMMUNICATION SYSTEM

TECHNICAL FIELD

The present invention relates to a communication apparatus, a communication control method, and a communication system.

BACKGROUND ART

Recently, a new communication method has been developed. The communication method uses a high-frequency electromagnetic wave referred to as a millimeter wave to increase the communication speed of wireless communication. The millimeter wave is regarded to have a wavelength of 10 to 1 mm and a frequency of 30 to 300 GHz so that a channel can be allocated in, for example, 60 GHz band by the GHz unit.

Generally, the millimeter wave has characteristics of more strongly traveling in a straight line and having a return loss larger than a microwave. Thus, a wireless communication pathway in a millimeter wave communication is mainly a direct wave or a wave reflected around once. Further, the millimeter wave has a characteristic of having a large free space propagation loss (a short reach of radio wave). Thus, in the case of performing wireless communication using the millimeter wave, while there is an advantage, in comparison with a case where the microwave is used, that the space is easy to divide, the communication distance will be shorter.

To compensate such a disadvantage of the millimeter wave in order to use a high-speed wireless communication using the millimeter wave in more situations, it is considered that the antennas of a transmitting apparatus and a receiving apparatus have directionalities and each of the transmission beam and the reception beam is directed toward the correspondent so that the communication distance is increased. The directionalities of the beams can be controlled, for example, by changing the weights of a plurality of antennas provided in each of the transmitting apparatus and the receiving apparatus. For example, Patent Literature 1 mentioned below discloses a technique for performing wireless communication with a millimeter wave by exchanging a control signal in advance using a communication medium such as a sound wave, an infrared ray, or a light to learn an optimal directionality of the antenna.

CITATION LIST

Patent Literature

Patent Literature 1: JP 2000-307494A

SUMMARY OF INVENTION

Technical Problem

However, even though the optimal directionality of an antenna has been learned, the antenna beam cannot be directed to a specific direction at the timing when the wireless communication with the millimeter wave occurs if the timing cannot be recognized. In particular, when the antenna is used by a plurality of communication schemes or when there is a plurality of the correspondents, it is difficult to always direct the antenna beam to a specific direction. Accordingly, in the case of a high-speed wireless communication with the millimeter wave necessary to control the directionality of the antenna, it is preferable to provide a mechanism where the receiving apparatus recognizes the timing to control the directionality of the antenna, and can form an optimal antenna beam at the timing.

In light of the foregoing, the present invention is aimed at providing a new and improved communication apparatus, a communication control method, and a communication system in which the receiving apparatus recognizes the timing to control the directionality of the antenna, and can form an optimal antenna beam at the timing.

Solution to Problem

According to the first aspect of the present invention in order to achieve the above-mentioned object, there is provided a communication apparatus including a first wireless communication part capable of performing wireless communication according to a first communication scheme, and a second wireless communication part capable of performing wireless communication according to a second communication scheme that uses a higher frequency band than the first communication scheme, wherein the second wireless communication part determines a reception timing to receive a beacon transmitted according to the second communication scheme based on a time when a predetermined control signal has been received by the first wireless communication part, and forms, at the determined reception timing, a reception beam having a directionality learned in advance.

Further, the control signal can include information indicating whether the beacon is transmitted following the control signal.

Further, when the beacon has not normally been received at the reception timing, the second wireless communication part can attempt to learn the directionality of the reception beam again.

Further, the control signal can include information indicating a temporal difference from a time when the control signal is received to the reception timing of the beacon.

Further, the second wireless communication part determines, as the reception timing of the beacon, a timing when a predetermined time has elapsed since the first wireless communication part has received the control signal.

According to another aspect of the present invention in order to achieve the above-mentioned object, there is provided a communication control method between a transmitting apparatus and a receiving apparatus capable of performing wireless communication according to a first communication scheme and a second communication scheme that uses a higher frequency band than the first communication scheme, respectively, the method including the steps of transmitting a predetermined control signal from the transmitting apparatus to the receiving apparatus according to the first communication scheme, determining a reception timing to receive a beacon transmitted according to the second communication scheme in the receiving apparatus based on a time when the control signal has been received, transmitting the beacon from the transmitting apparatus to the receiving apparatus according to the second communication scheme, and receiving the beacon transmitted from the transmitting apparatus by forming, at the determined reception timing in the receiving apparatus, a reception beam having a directionality learned in advance.

According to another aspect of the present invention in order to achieve the above-mentioned object, there is provided a communication system including a transmitting apparatus and a receiving apparatus each including a first wireless communication part capable of performing wireless communication according to a first communication scheme; and a second wireless communication part capable of performing wireless communication according to a second communication scheme that uses a higher frequency band than the first communication scheme, wherein the first wireless communication part in the transmitting apparatus transmits a predetermined control signal to the receiving apparatus according to the first communication scheme, the second wireless communication part in the receiving apparatus determines a reception timing to receive a beacon transmitted according to the second communication scheme based on a time when the control signal has been received, the second wireless communication part in the transmitting apparatus transmits the beacon to the receiving apparatus according to the second communication scheme, and the second wireless communication part in the receiving apparatus receives the beacon transmitted from the transmitting apparatus by forming, at the determined reception timing, a reception beam having a directionality learned in advance.

Advantageous Effects of Invention

As described above, according to the communication apparatus, the communication control method, and the communication system of the present invention, the receiving apparatus recognizes the timing to control the directionality of an antenna, and an optimal antenna beam can be formed at the timing.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the "Description of Embodiments" will be described in the following order.
1. Overview of Communication System According to an Embodiment
2. Explanation of an Embodiment
   2-1. Exemplary Configuration of Transmitting Side
   2-2. Exemplary Signal Format
   2-3. Exemplary Configuration of Receiving Side
   2-4. Flow of Process
3. Conclusion <1. Overview of Communication System According to an Embodiment>

Figure 1:
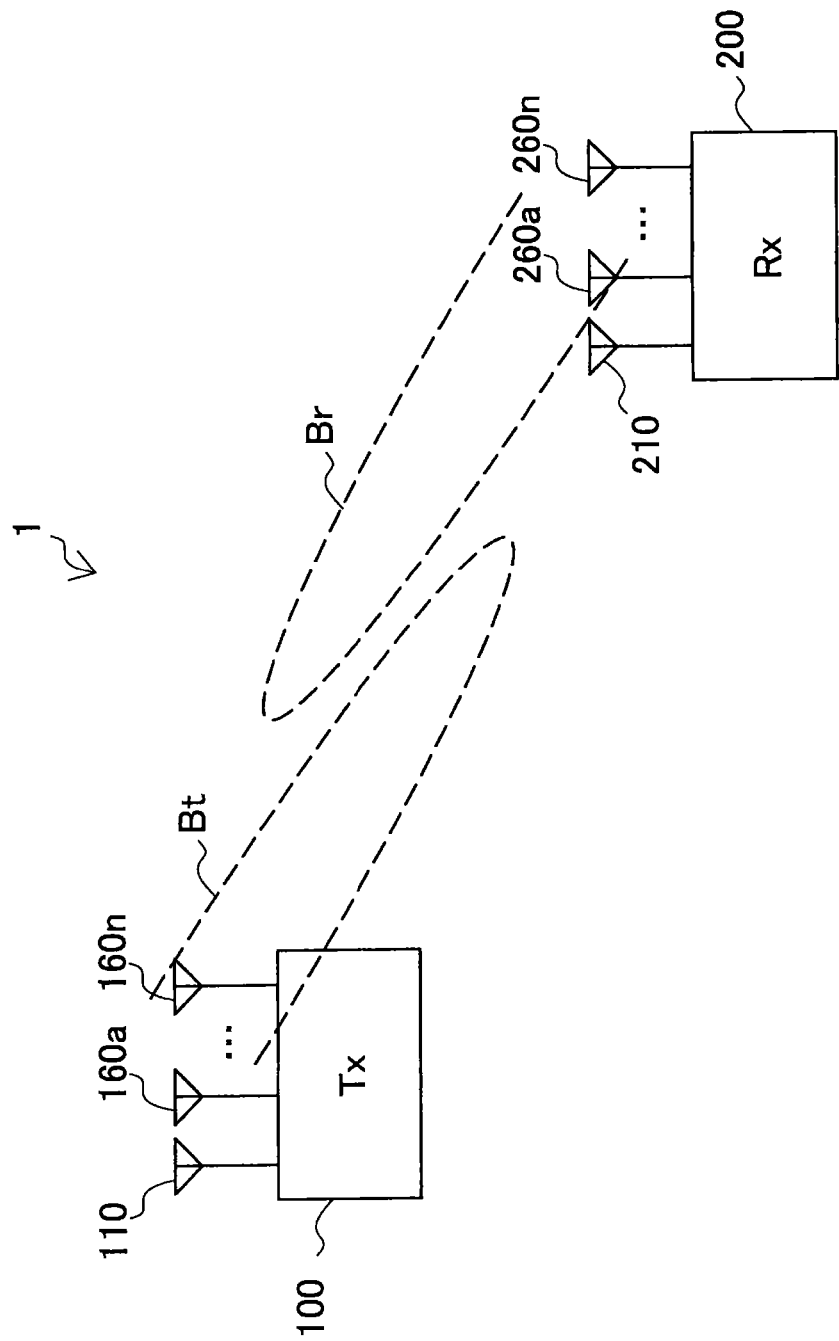
FIG. 1 is a schematic illustration of the overview of a communication system according to an embodiment.

FIG. 1 is a schematic illustration of the overview of a communication system 1 according to an embodiment of the present invention. With reference to FIG. 1, the communication system 1 includes a communication apparatus 100 and a communication apparatus 200. The communication apparatus 100 transmits a control signal that leads the start of a high-speed communication between the communication apparatus 100 and the communication apparatus 200 in the present embodiment. The communication apparatus 200 receives the control signal transmitted from the communication apparatus 100 and directs the directionality of an antenna beam toward a direction where the communication apparatus 100 is present at the timing determined based on the control signal. Thus, herein, the communication apparatus 100 is sometimes referred to as an apparatus on the transmitting side or a transmitting apparatus and the communication apparatus 200 is sometimes referred to as an apparatus on the receiving side or a receiving apparatus.

The communication apparatuses 100 and 200 can communicate with each other via radio waves according to a first communication scheme and a second communication scheme. Of these, the first communication scheme uses an electromagnetic wave such as a microwave that travels in a straight line less strongly and has a return loss smaller than the above-mentioned millimeter wave. The first communication scheme can be based on wireless Local Area Network (LAN) standards such as IEEE802.11a/b/g/n. In other words, when the wireless communication is performed according to the first communication scheme, the communication apparatuses 100 and 200 can communicate with each other regardless of the directionalities of the antenna beams. On the other hand, the second communication scheme uses an electromagnetic wave typified by the above-mentioned millimeter wave that strongly travels in a straight line and has a large return loss. The second communication scheme can be based, for example, on a standard 802.11ad (also referred to as Very High Throughput (VHT)) using a 60 GHz band. In other words, when the wireless communication is performed according to the second communication scheme, the communication apparatuses 100 and 200 preferably transmit and receive a wireless signal while directing the antenna beams toward the correspondent.

In the example shown in FIG. 1, the communication apparatus 100 includes an antenna 110 configured to transmit and receive a wireless signal according to the first communication scheme, and a plurality of antennas 160a to 160n configured to transmit and receive a wireless signal according to the second communication scheme. The antenna 110 can physically be the same as one of the antennas 160a to 160n. The communication apparatus 200 includes an antenna 210 configured to transmit and receive a wireless signal according to the first communication scheme, and a plurality of antennas 260a to 260n configured to transmit and receive a wireless signal according to the second communication scheme. The antenna 210 can physically be the same as one of the antennas

260a to 260n. The communication apparatuses 100 and 200 can perform a so-called Multiple Input Multiple Output (MIMO) communication using such antennas 160a to 160n and antennas 260a to 260n according to the second communication scheme. Thus, the weight of the signal transmitted and received through each of the antennas is adjusted to control the directionality of the antenna beam during the wireless communication according to the second communication scheme. With reference to FIG. 1, for example, a transmission beam Bt is directed from the communication apparatus 100 toward the communication apparatus 200. Also for example, a reception beam Br is directed from the communication apparatus 200 toward the communication apparatus 100.

Note that the communication apparatuses 100 and 200 can be a terminal equipment such as a Personal Computer (PC), a mobile phone terminal, a handheld terminal, a music player, or a game terminal; or a household electrical appliance such as a television receiver. Alternatively, the communication apparatuses 100 and 200 can also be a network equipment such as a broadband router or a wireless access point. Further, the communication apparatuses 100 and 200 can also be, for example, a wireless communication module mounted on these equipments.

<2. Explanation of an Embodiment>
(2-1. Exemplary Configuration of Transmitting Side)

Figure 2:
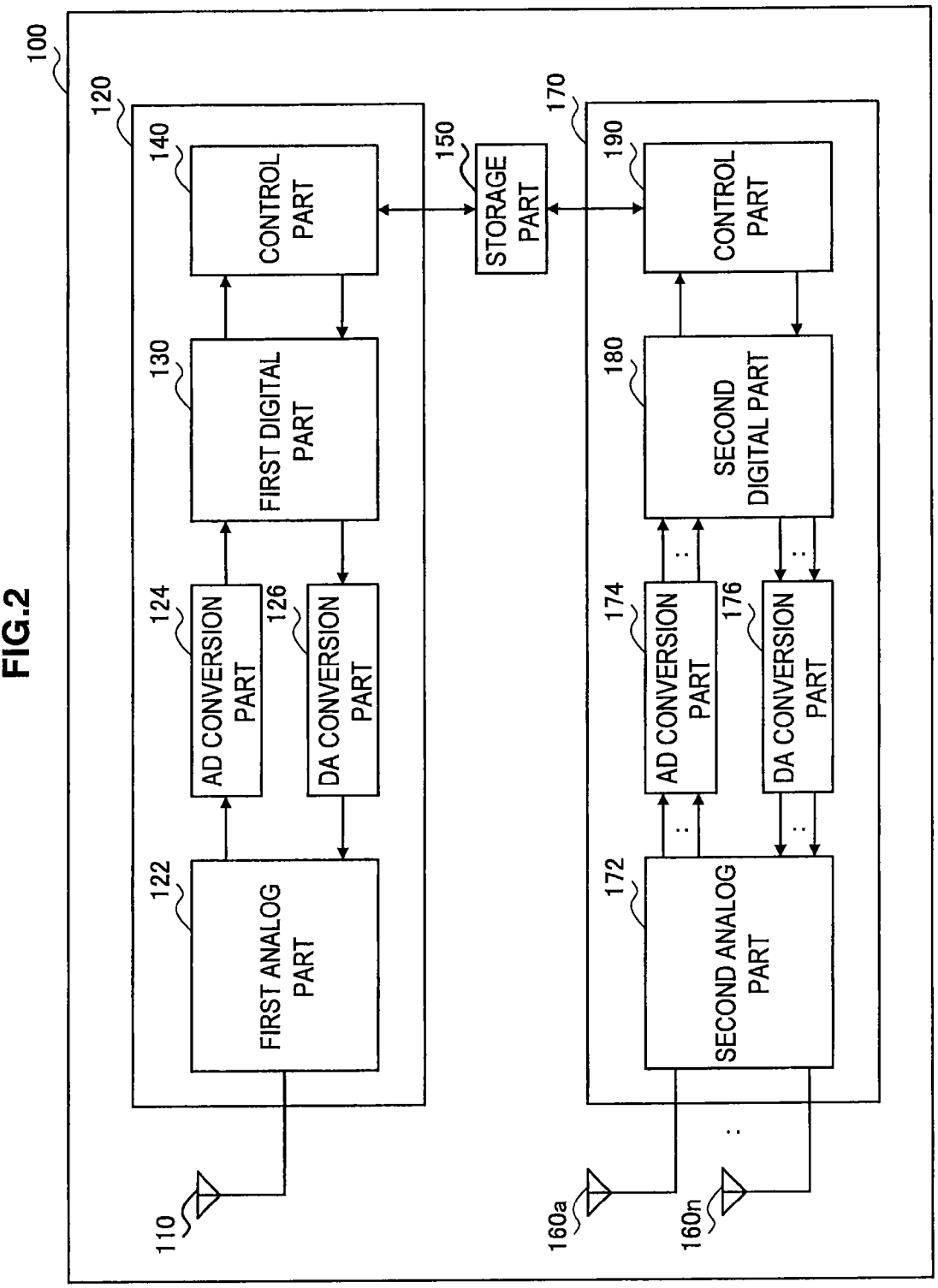
FIG. 2 is a block diagram of an exemplary configuration of a transmitting apparatus according to an embodiment.

FIG. 2 is a block diagram of an exemplary configuration of the communication apparatus 100 according to an embodiment. With reference to FIG. 2, the communication apparatus 100 includes the antenna 110, a first wireless communication part 120, a storage part 150, the antennas 160a to 160n, and a second wireless communication part 170. Also, the first wireless communication part 120 includes a first analog part 122, an Analog-to-Digital (AD) conversion part 124, a Digital-to-Analog (DA) conversion part 126, a first digital part 130, and a control part 140. The second wireless communication part 170 includes a second analog part 172, an AD conversion part 174, a DA conversion part 176, a second digital part 180, and a control part 190.

The first analog part 122 is typically corresponds to a Radio Frequency (RF) circuit for transmitting and receiving a wireless signal according to the first communication scheme. In other words, the first analog part 122, for example, amplifies the received signal received from the antenna 110, converts the frequency and outputs the signal to the AD conversion part 124. Also, the first analog part 122 converts the frequency of the transmitted signal that has been converted into an analog signal by the DA conversion part 126 and outputs the signal to the antenna 110.

The AD conversion part 124 converts the received signal that is an analog signal input from the first analog part 122 into a digital signal, and output the signal to the first digital part 130. The DA conversion part 126 converts the transmitted signal that is a digital signal input from the first digital part 130 into an analog signal, and outputs the signal to the first analog part 122.

The first digital part 130 typically includes a circuit for demodulating and decoding the received signal according to the first communication scheme, and a circuit for encoding and modulating the transmitted signal according to the first communication scheme. For example, when the transmitted signal is input from the control part 140, the first digital part 130 encodes and modulates the transmitted signal, and outputs the signal to the DA conversion part 126. The transmitted signal processed by the first digital part 130 includes, for example, a learning instruction signal and a control signal in addition to a signal for a normal data communication. The learning instruction signal and the control signal will be described below. Further, for example, when the received signal is input from the AD conversion part 124, the first digital part 130 demodulates and decodes the received signal, and outputs the signal to the control part 140.

The control part 140 controls whole the operations in the first wireless communication part 120 using a calculation device such as a Central Processing Unit (CPU). For example, the control part 140 first makes the learning instruction signal transmitted from the first wireless communication part 120 to the communication apparatus 200 in response to the request from the communication apparatus 200. The learning instruction is for instructing the learning of the directionality of a beam. After that, when a notification signal is received from the communication apparatus 200, the control part 140 stores a parameter value in the storage part 150. The notification signal is for notifying the result from the learning of the directionality of the beam. The parameter value is for specifying an optimal beam pattern included in the notification signal. Further, the control part 140 makes the control signal transmitted from the first wireless communication part 120 to the communication apparatus 200, for example, in response to a request for the start of wireless communication according to the second communication scheme. The control signal is for starting the wireless communication according to the second communication scheme.

The storage part 150 stores a program and a parameter value using a recording medium such as a semiconductor memory. The program and the parameter value are used for a communication process by the communication apparatus 100. For example, in the present embodiment, the storage part 150 stores a parameter value, for example, in relation to the identifier of the correspondent device. The parameter value is for specifying an optimal beam pattern during wireless communication by the second wireless communication part 170 according to the second communication scheme.

The antennas 160a to 160n are used for wireless communication according to the second communication scheme. The antennas 160a to 160n are typically configured as a MIMO antenna. In other words, for example, each of the antennas 160a to 160n transmits a wireless signal using the millimeter wave. The wireless signals are weighted using a predetermined weight coefficient. Further, for example, the antennas 160a to 160n receive wireless signals that are millimeter waves, and output the wireless signals to the second analog part 172.

The second analog part 172 typically corresponds to an RF circuit for transmitting and receiving a wireless signal according to the second communication scheme. In other word, the second analog part 172 amplifies, for example, a plurality of received signals received from the antennas 160a to 160n, respectively, and converts the frequencies of the signals, and outputs the signals to the AD conversion part 174. Further, the second analog part 172 independently converts the frequencies of a plurality of transmitted signals that have been converted into analog signals by the DA conversion part 176, and outputs the signals to the antennas 160a to 160n.

The AD conversion part 174 independently converts a plurality of received signals that are analog signals input from the second analog part 172 into digital signals, and outputs the signals to the second digital part 180. The DA conversion part 176 converts a plurality of transmitted signals that are digital signals input from the second digital part 180 into analog signals, and outputs the signals to the second analog part 172.

The second digital part 180 typically includes a circuit for demodulating and decoding the received signal according to the second communication scheme, and a circuit for encoding and modulating the transmitted signal according to the second communication scheme.

Figure 3:
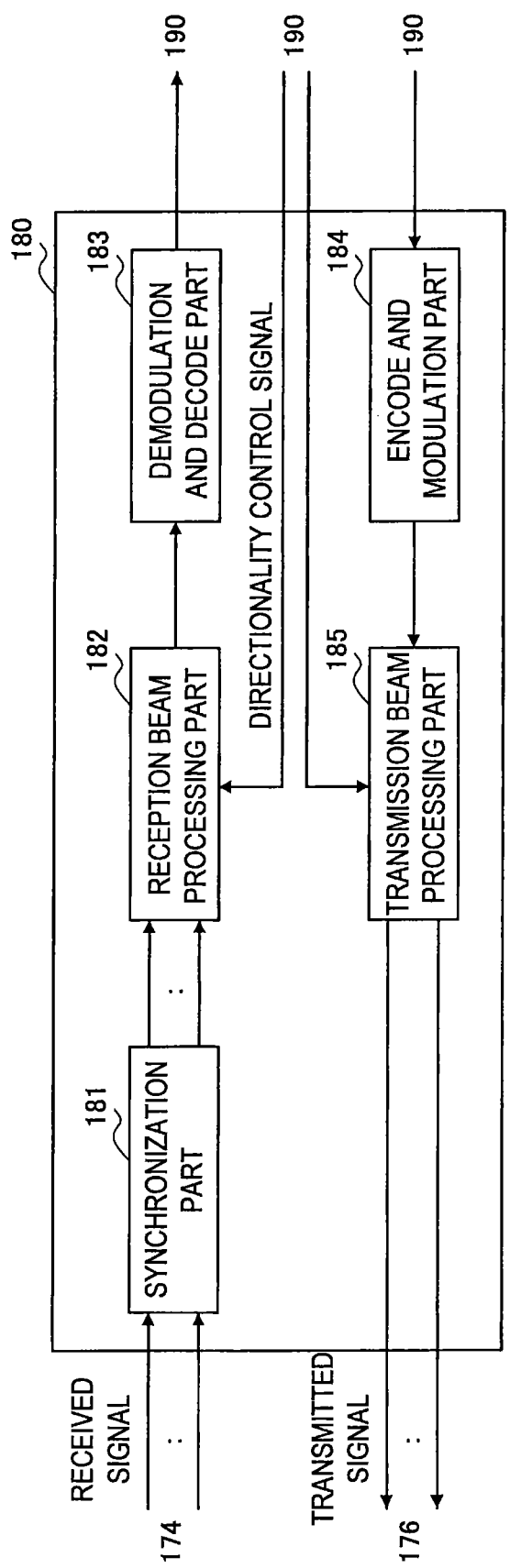
FIG. 3 is a block diagram of an example of a more concrete configuration of a second digital part of the transmitting apparatus according to an embodiment.

FIG. 3 is a block diagram of an example of a more concrete configuration of the second digital part 180. With reference to FIG. 3, the second digital part 180 includes a synchronization part 181, a reception beam processing part 182, a demodulation and decode part 183, an encode and modulation part 184, and a transmission beam processing part 185.

The synchronization part 181 synchronizes the start timings of a reception process in relation to a plurality of the received signals received by the antennas 160a to 160n, for example, according to the preamble at the head of a packet, and outputs the signals to the reception beam processing part 182.

The reception beam processing part 182 performs a weighting process on the received signals input from the synchronization part 181, for example, according to a uniform distribution or Taylor distribution, in order to control the directionalities of the reception beams. The value of the weight used by the reception beam processing part 182 is specified, for example, by a directionality control signal input from the control part 190. Alternatively, the reception beam processing part 182 can form reception beams on the supposition that the antennas 160a to 160n are array antennas.

The demodulation and decode part 183 demodulates and decodes the received signal that has been weighted by the reception beam processing part 182 according to a given modulating scheme and a given encoding scheme, in order to obtain a data signal. The modulating scheme and the given encoding scheme are used for the second communication scheme. Then, the demodulation and decode part 183 outputs the obtained data signal to the control part 190.

The encode and modulation part 184 encodes and modulates the data signal input from the control part 190 according to the given encoding scheme and the given modulating scheme used for the second communication scheme, in order to generate a transmitted signal. Then, the encode and modulation part 184 outputs the generated transmitted signal to the transmission beam processing part 185.

The transmission beam processing part 185 generates, from the transmitted signal input from the encode and modulation part 184, a plurality of transmitted signals that has been weighted, for example, according to a uniform distribution or Taylor distribution, in order to control the directionalities of the transmission beams. The value of the weight used by the transmission beam processing part 185 is specified, for example, according to the directionality control signal input from the control part 190. Alternatively, the transmission beam processing part 185 can form the transmission beams on the supposition that the antennas 160a to 160n are array antennas. The transmitted signals that have been weighted by the transmission beam processing part 185 are output to the DA conversion part 176, respectively.

Although not shown in FIG. 3, note that, in the second digital part 180, the channel characteristic of the MIMO channel is also estimated according to the received signals received by the antennas 160a to 160n, and a channel equalization can be performed according to the estimation result.

Going back to FIG. 2, the description of the exemplary configuration of the communication apparatus 100 will be continued.

For example, the control part 190 controls whole the operations of the second wireless communication part 170, for example, using a calculation device such as a CPU. For example, the control part 190 makes a beam learning signal transmitted from the second wireless communication part 170 after a predetermined time T1 (hereinafter, referred to as an offset T1) has elapsed since the above-mentioned learning instruction signal has been transmitted from the first wireless communication part 120. Further, for example, the control part 190 makes a beacon transmitted from the second wireless communication part 170 after a predetermined time T2 (hereinafter, referred to as an offset T2) has elapsed since the above-mentioned control signal has been transmitted from the first wireless communication part 120. The beacon is for the wireless communication according to the second communication scheme. Further, the control part 190 obtains, from the storage part 150, a parameter value for specifying an optimal beam pattern, and can output the directionality control signal to the reception beam processing part 182 or the transmission beam processing part 185 in the second digital part 180 according to the obtained parameter value.

(2-2. Exemplary Signal Format)

Figure 4:
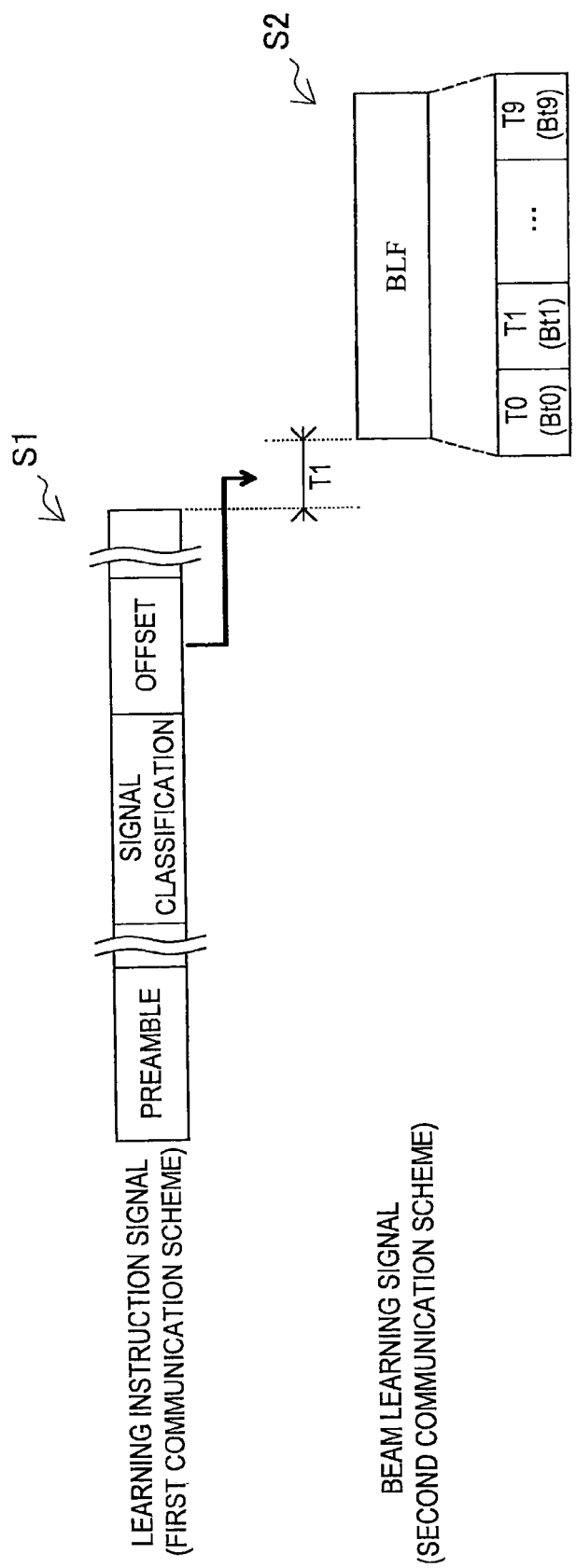
FIG. 4 is an explanatory diagram of exemplary formats of a learning instruction signal and a beam learning signal.

FIG. 4 is an explanatory diagram of exemplary signal formats of a learning instruction signal and a beam learning signal transmitted from the communication apparatus 100.

With reference to FIG. 4, a learning instruction signal S1 transmitted according to the first communication scheme includes two fields, a "signal classification" and an "offset", in addition to a preamble. The preamble corresponds to, for example, a Legacy-Short Training Field (L-STF) or a Legacy-Long Training Field (L-LTF). The preamble is used for, for example, the detection of a packet, an automatic gain control, a synchronizing process, and a channel estimation. Although not shown in the drawing, information including the length of the signal, the system ID, and the time stamp can be added to the learning instruction signal S1, following the preamble. The "signal classification" is a field denoting the type of the signal. A value indicating that the signal is a learning instruction signal is stored in the "signal classification" field of the learning instruction signal S1. The receiving apparatus can recognize, with reference to the "signal classification" field, that the beam learning signal S2 is transmitted following the signal. The value of the offset T1 for determining the reception timing to receive the beam learning signal is stored in the "offset" field. The offset T1, for example, can be a temporal difference from the end of the reception of the learning instruction signal S1 to the start of the reception of the beam learning signal S2. The offset T1 can be zero. Alternatively, when, for example, the temporal difference from the end of the reception of the learning instruction signal S1 to the start of the reception of the beam learning signal S2 is predetermined by a communication standard (or by a prior negotiation between the communication apparatuses), the "offset" field can be omitted.

On the other hand, the beam learning signal S2 transmitted according to the second communication scheme includes a beam learning field (BLF). The (BLF) is transmitted, in response to the control by the control the control part 190, at the timing when the offset T1 elapses from the end of transmission of the above-mentioned learning instruction signal.

In the present embodiment, the (BLF) of the beam learning signal S2 includes ten time slots T0 to T9 corresponding to ten types of transmission beam patterns Bt0 to Bt9 as an example, respectively. In each of the time slots T0 to T9, the known signal sequence used for learning the beam at the receiving side is weighted using the weight coefficient for forming each of the corresponding transmission beam patterns Bt0 to Bt9. In other words, the directionality of the transmission beam of the beam learning signal sequentially changes at every time slots T0 to T9. Accordingly, in the receiving apparatus positioned around the communication apparatus 100, the power level of the received signal in one of the time slots of the beam learning signal has an outstanding value depending on the position so that the optimal transmission beam pattern can be determined. Note that the known signal sequence can be, for example, a random pattern of Binary Phase Shift Keying (BPSK).

Figure 5:
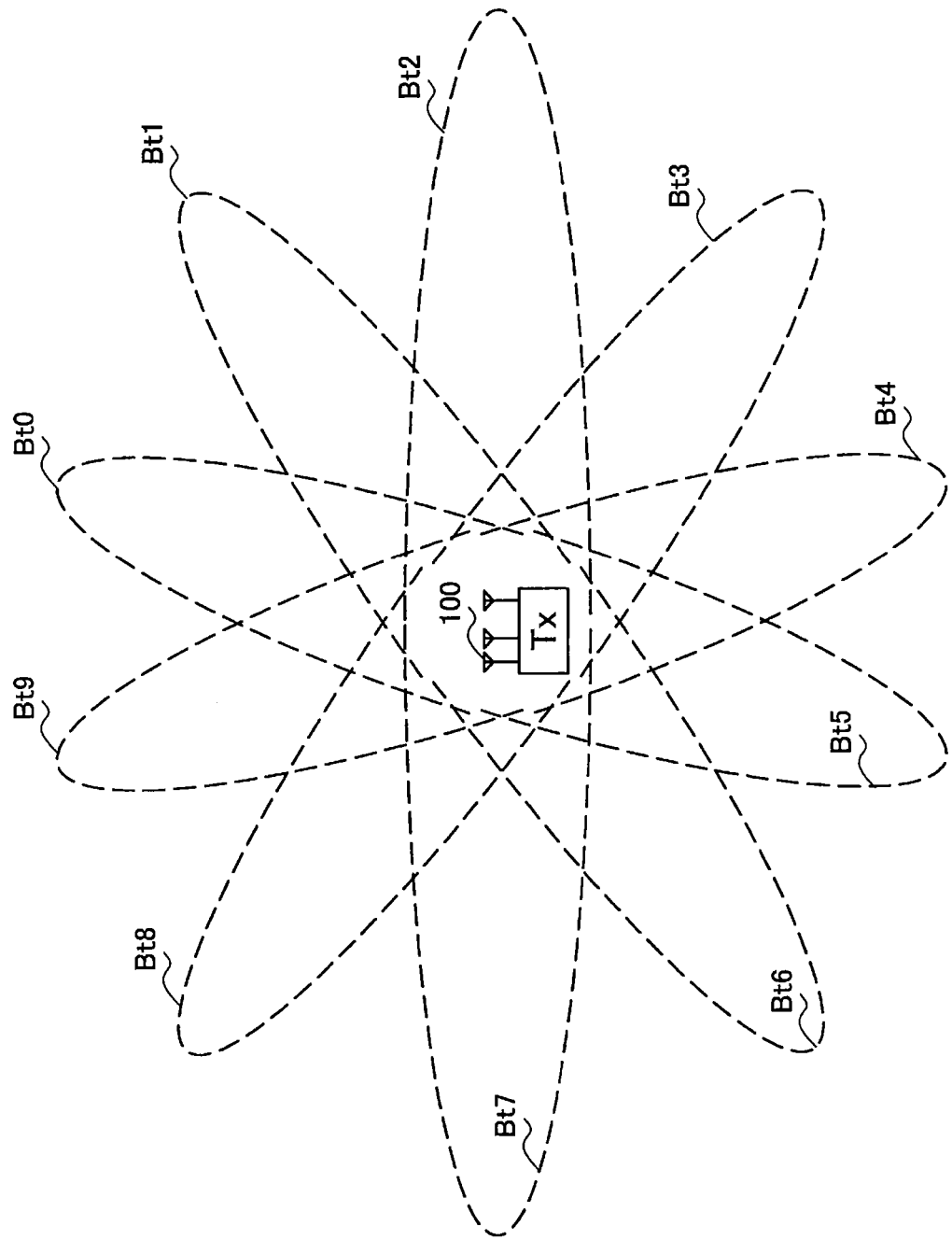
FIG. 5 is an explanatory diagram of an exemplary beam pattern.

FIG. 5 is an explanatory diagram of an exemplary beam pattern that can be formed by the communication apparatus 100.

With reference to FIG. 5, ten transmission beam patterns Bt0 to Bt9 are shown. The transmission beam patterns Bt0 to Bt9 can be formed by the communication apparatus 100 in the present embodiment. The transmission beam patterns Bt0 to Bt9 independently have directionalities in directions different from each other by 36 degrees on the plane surface at which the communication apparatus 100 is positioned. The transmission beam processing part 185 in the communication apparatus 100 can transmit wireless signals from the antennas 160a to 160n using one of the ten transmission beam patterns Bt0 to Bt9 in response to the directionality control signal from the control part 190. Further, the reception beam pattern that can be formed by the communication apparatus 100 can be the same as the transmission beam patterns Bt0 to Bt9 shown in FIG. 5. For example, the weight coefficient of each of the antennas 160a to 160n for forming these beam patterns is stored in the storage part 150 of the communication apparatus 100 in advance. Note that the transmission beam pattern and the reception beam pattern that can be formed by the communication apparatus 100 are not limited to the example. For example, a transmission beam pattern or a reception beam pattern that has the directionality in various directions in a three dimensional space can be formed. Further, the beam patterns that can be formed by the communication apparatus 200 are the same as the beam pattern that can be formed by the communication apparatus 100.

Figure 6:
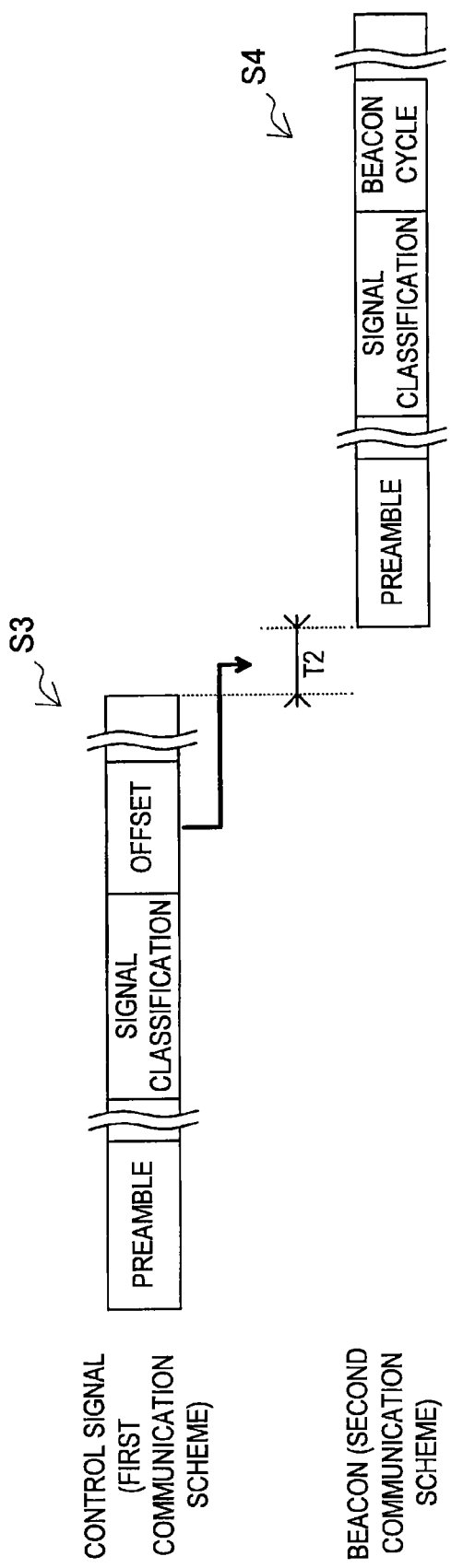
FIG. 6 is an explanatory diagram of exemplary formats of a control signal and a beacon.

FIG. 6 is an explanatory diagram of exemplary signal formats of the above-mentioned control signal and beacon transmitted from the communication apparatus 100.

With reference to FIG. 6, a control signal S3 transmitted according to the first communication scheme includes two fields, a "signal classification" and an "offset", in addition to a preamble. The "signal classification" is a field denoting the type of the signal. A value indicating that the signal is a control signal is stored in the "signal classification" field of the control signal S3. The control signal can be used for determining the reception timing of a beacon that is transmitted according to the second communication scheme. The receiving apparatus can recognize, with reference to the "signal classification" field, that a beacon S4 is transmitted following the signal. The value of an offset T2 for determining the reception timing to receive the beacon S4 is stored in the "offset" field. The offset T2, for example, can be a temporal difference from the end of the reception of the control signal S3 to the start of the reception of the beacon S4. The offset T2 can be zero. When, for example, the temporal difference from the end of the reception of the control signal S3 to the start of the reception of the beacon S4 is predetermined by a communication standard (or by a prior negotiation between the communication apparatuses), the "offset" field can be omitted.

Note that the control signal S3 can be an existing signal such as a beacon or a Request To Send (RTS) that has been defined by a communication standard such as existing IEEE802.11a/b/g/n. In that case, the "signal classification" and "offset" fields can be provided in an extension region for the existing signal format. Alternatively, the control signal S3 can be a signal that is newly defined as a whole.

On the other hand, the beacon S4 transmitted according to the second communication scheme includes two fields, a "signal classification" and a "beacon cycle", in addition to a preamble. A value indicating that the signal is a beacon is stored in the "signal classification" field of the control signal S3. The beacon is for wireless communication according to the second communication scheme. The "beacon cycle" field indicates a cycle in a case where the beacon S4 is periodically transmitted. Once the receiving apparatus has succeeded in the reception of the beacon S4, the receiving apparatus can continuously adjust the reception timing to receive the beacon after that with reference to the "beacon cycle" field. Note that, although not shown in the drawing, information including, for example, the length of the signal, the system ID, and the time stamp can be added to the beacon S4.

(2-3. Exemplary Configuration of Receiving Side)

Figure 7:
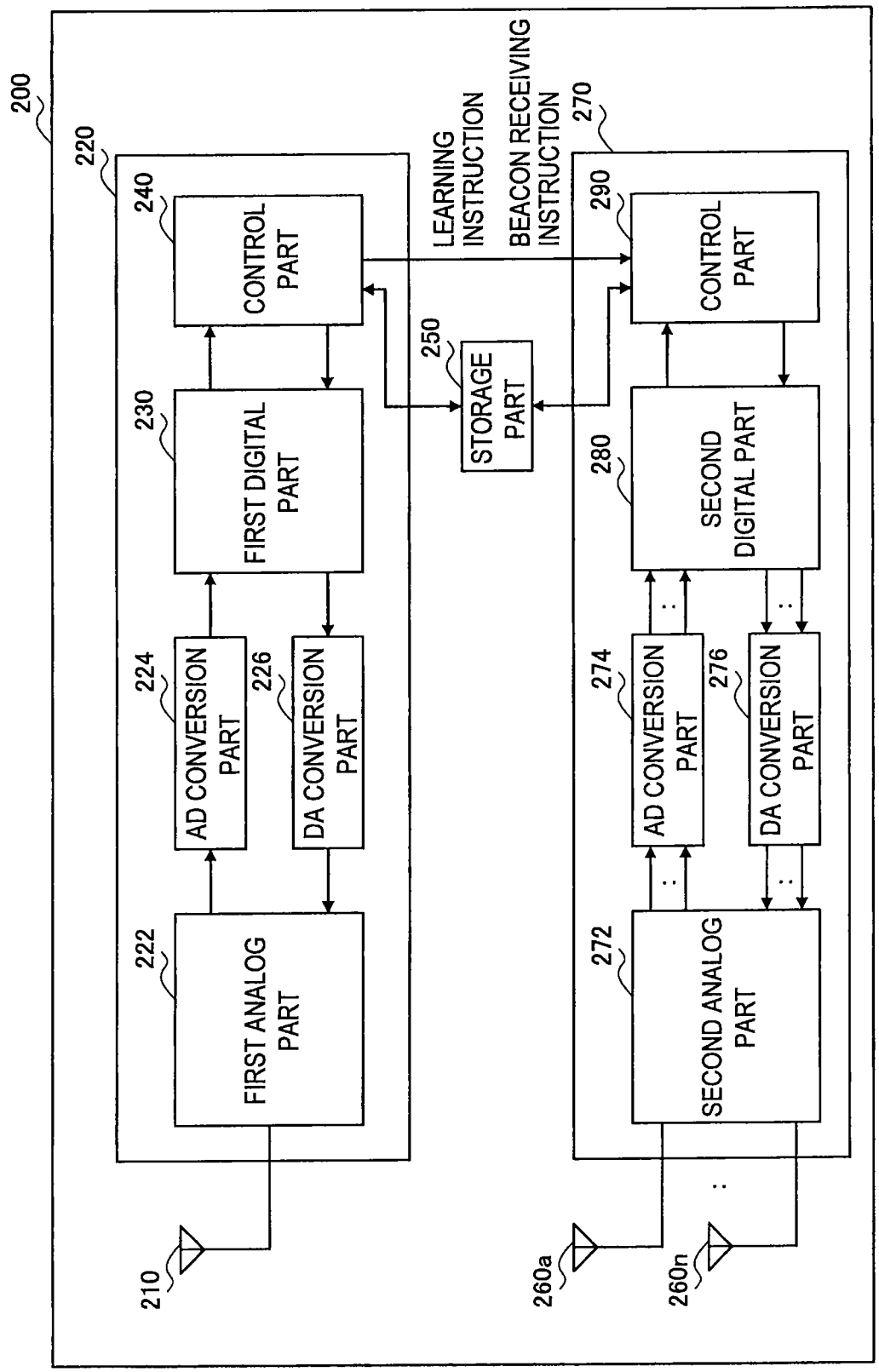
FIG. 7 is a block diagram of an exemplary configuration of a receiving apparatus according to an embodiment.

FIG. 7 is a block diagram of an exemplary configuration of the communication apparatus 200 according to the present embodiment. With reference to FIG. 7, the communication apparatus 200 includes the antenna 210, a first wireless communication part 220, a storage part 250, the antennas 260a to 260n, and a second wireless communication part 270. Further, the first wireless communication part 220 includes a first analog part 222, an AD conversion part 224, a DA conversion part 226, a first digital part 230, and a control part 240. The second wireless communication part 270 includes a second analog part 272, an AD conversion part 274, a DA conversion part 276, a second digital part 280, and a control part 290.

The first analog part 222 typically corresponds to an RF circuit for transmitting and receiving a wireless signal according to the first communication scheme. In other words, the first analog part 222, for example, amplifies the received signal received from the antenna 210, converts the frequency and outputs the signal to the AD conversion part 224. Also, the first analog part 222 converts the frequency of the transmitted signal that has been converted into an analog signal by the DA conversion part 226 and outputs the signal to the antenna 210.

The AD conversion part 224 converts the received signal that is an analog signal input from the first analog part 222 into a digital signal, and outputs the signal to the first digital part 230. The DA conversion part 226 converts the transmitted signal that is a digital signal input from the first digital part 230 into an analog signal, and outputs the signal to the first analog part 222.

The first digital part 230 typically includes a circuit for demodulating and decoding the received signal according to the first communication scheme, and a circuit for encoding and modulating the transmitted signal according to the first communication scheme. For example, when the transmitted signal is input from the control part 240, the first digital part 230 encodes and modulates the transmitted signal, and outputs the signal to the DA conversion part 226. The transmitted signal processed by the first digital part 230 includes, for example, a notification signal in addition to a signal for a normal data communication. The notification signal is for notifying the result from the learning of the directionality of the antenna beam to the communication apparatus 100. Further, for example, when the received signal is input from the AD conversion part 224, the first digital part 230 demodulates and decodes the received signal, and outputs the signal to the control part 240. The received signal processed by the first digital part 230 includes, for example, the learning instruction signal and the control signal that have been described with reference to FIGS. 4 and 6 in addition to a signal for a normal data communication.

The control part 240 controls whole the operations in the first wireless communication part 220 using a calculation device such as a CPU. For example, when the directionality of the beam for the wireless communication according to the second communication scheme has not been learned yet, or when it is determined that the learned directionality is no longer the optimal directionality, the control part 240 makes a transmission request of the beam learning signal transmitted from the first wireless communication part 220 to the communication apparatus 100. Then, when the above-mentioned learning instruction signal is received from the communication apparatus 100, the control part 240 instructs the second wireless communication part 270 to learn the directionality of the beam. At that time, when the learning instruction signal includes the value of the offset T1, the control part 240 notifies the second wireless communication part 270 of the value of the offset T1 together with the learning instruction. Further, when the optimal beam pattern is determined by the second wireless communication part 270, the control part 240 obtains, from the storage part 250, the parameter value for specifying the determined optimal beam pattern, and makes a notification signal transmitted from the first wireless communication part 220 to the communication apparatus 100. The notification signal is for notifying the obtained parameter value. Further, when the above-mentioned control signal is received from the communication apparatus 100, the control part 240 instructs the second wireless communication part 270 to receive a beacon for the wireless communication according to the second communication scheme.

The storage part 250 stores a program and a parameter value using a recording medium such as a semiconductor memory. The program and the parameter value are used for a communication process by the communication apparatus 200. For example, in the present embodiment, the storage part 250 stores a parameter value for specifying the optimal beam pattern during wireless communication by the second wireless communication part 270 according to the second communication scheme. Further, the storage part 250 stores, for example, a parameter value for specifying the optimal beam pattern of the transmitting side determined by the second wireless communication part 270 that will be described below.

The antennas 260*a* to 260*n* are used for wireless communication according to the second communication scheme. The antennas 260*a* to 260*n* are typically configured as a MIMO antenna. In other words, for example, each of the antennas 260*a* to 260*n* transmits a wireless signal using the millimeter wave. The wireless signals are weighted using a predetermined weight coefficient. Further, for example, the antennas 260*a* to 260*n* receive wireless signals that are millimeter waves, and output the wireless signals to the second analog part 272.

The second analog part 272 typically corresponds to an RF circuit for transmitting and receiving a wireless signal according to the second communication scheme. In other word, the second analog part 272 amplifies a plurality of received signals independently received from, for example, the antennas 260*a* to 260*n* and converts the frequencies of the signals, and outputs the signals to the AD conversion part 274. Further, the second analog part 272 converts the frequencies of a plurality of transmitted signals that have independently been converted into analog signals by the DA conversion part 276, and outputs the signals to the antennas 260*a* to 260*n*.

The AD conversion part 274 independently converts the received signals that are analog signals input from the second analog part 272 into digital signals, and outputs the signals to the second digital part 280. The DA conversion part 276 converts the transmitted signals that are digital signals input from the second digital part 280 into analog signals, and outputs the signals to the second analog part 272.

The second digital part 280 typically includes a circuit for demodulating and decoding the received signal according to the second communication scheme, and a circuit for encoding and modulating the transmitted signal according to the second communication scheme. For example, when the transmitted signal is input from the control part 290, the second digital part 280 encodes and modulates the transmitted signal, and outputs the signal to the DA conversion part 276. Further, for example, when the received signal is input from the AD conversion part 274, the second digital part 280 demodulates and decodes the received signal, and outputs the signal to the control part 290. The received signal processed by the second digital part 280 includes, for example, a beam learning signal and a beacon for wireless communication according to the second communication scheme in addition to a signal for a normal data communication. The beam learning signal and the beacon have been described with reference to FIGS. 4 and 6.

Figure 8:
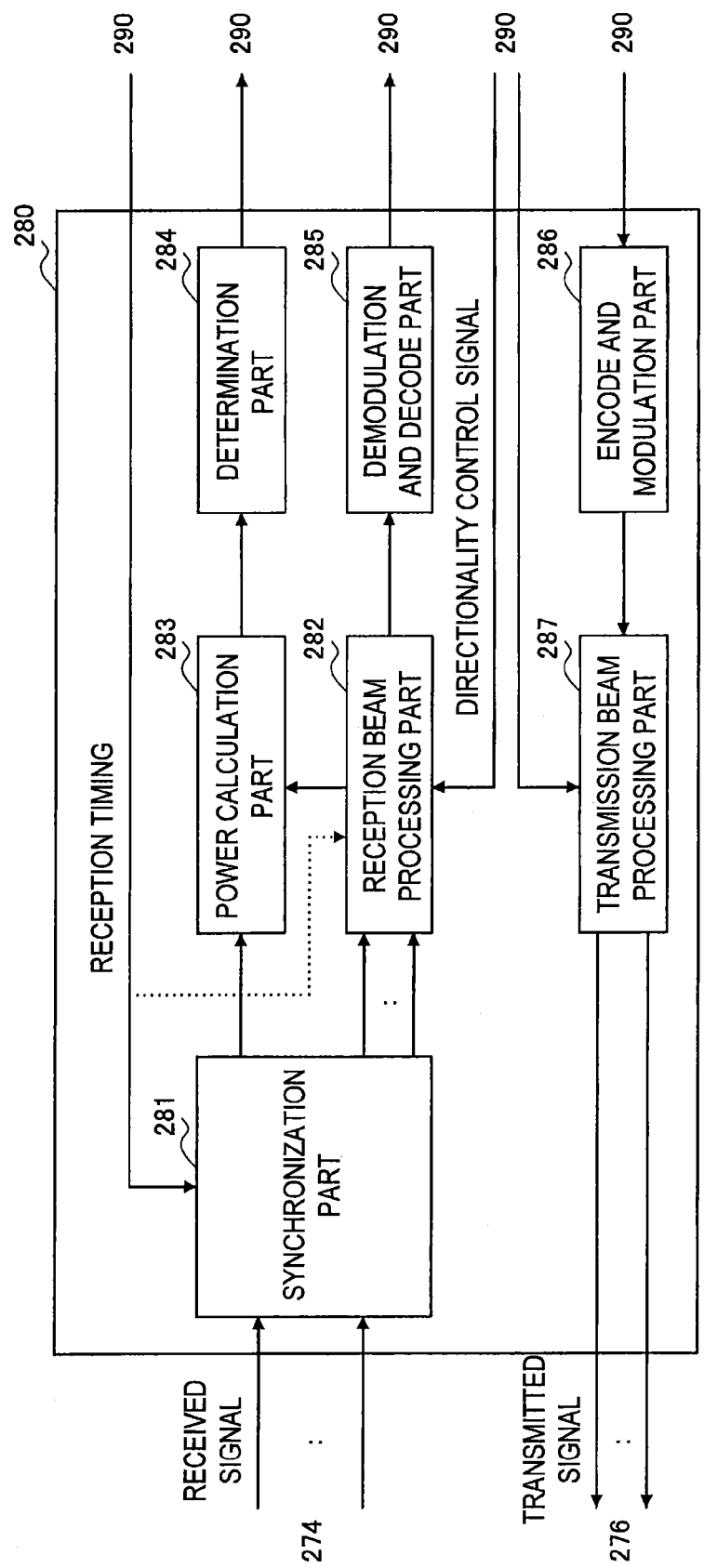
FIG. 8 is a block diagram of an example of a more concrete configuration of a second digital part of the receiving apparatus according to an embodiment.

FIG. 8 is a block diagram of an example of a more concrete configuration of the second digital part 280. With reference to FIG. 8, the second digital part 280 includes a synchronization part 281, a reception beam processing part 282, a power calculation part 283, a determination part 284, a demodulation and decode part 285, an encode and modulation part 286, and a transmission beam processing part 287.

The synchronization part 281 synchronizes, for example, the start timings of a reception process in relation to a plurality of the received signals received by the antennas 260*a* to 260*n* according to the preamble at the head of a packet, and outputs the signals to the reception beam processing part 282. Further, when the reception timing of the beam learning signal is notified from the control part 290, the synchronization part 281 starts receiving the beam learning signal from the reception timing. Then, the synchronization part 281 outputs the received beam learning signal to the reception beam processing part 282, and instructs the power calculation part 283 to calculate the received power. Further, when the timing to receive the beacon is notified from the control part 290, the synchronization part 281 starts receiving the beacon from the reception timing.

The reception beam processing part 282 performs a weighting process on the received signals input from the synchronization part 281, for example, according to a uniform distribution or Taylor distribution, in order to control the directionality of the reception beam in the same manner as the above-mentioned reception beam processing part 182. Then, the reception beam processing part 282 outputs the weighted received signal to the power calculation part 283 and the demodulation and decode part 285.

Figure 9:
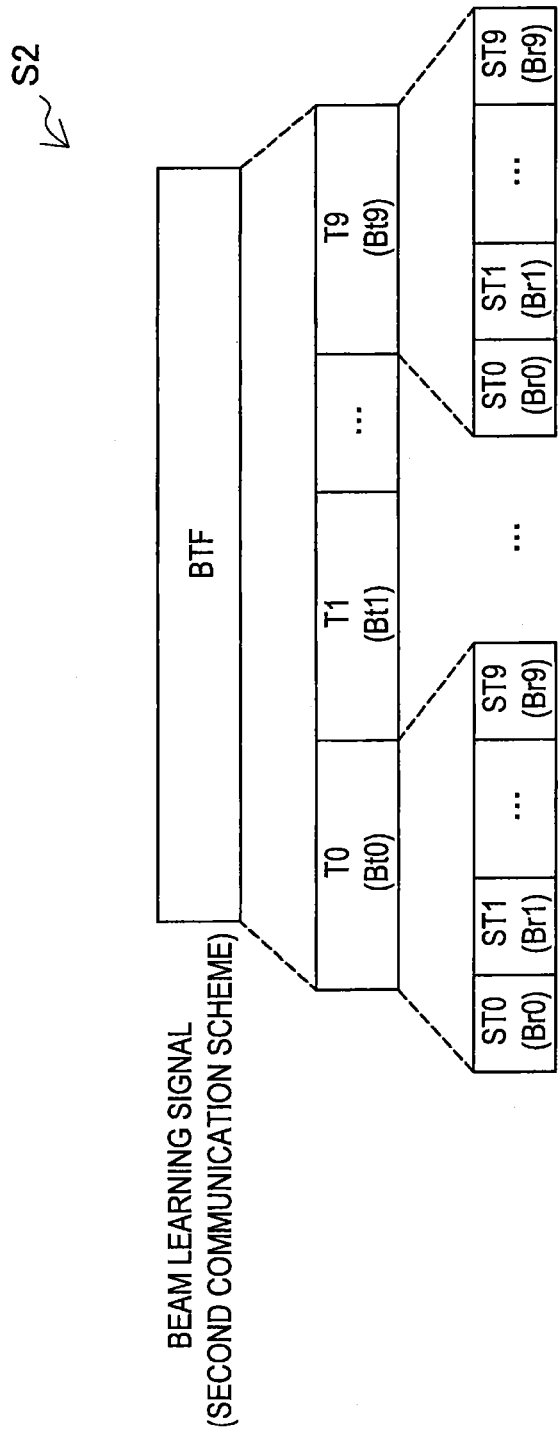
FIG. 9 is an explanatory diagram for explaining a process for learning a directionality according to an embodiment.

FIG. 9 is an explanatory diagram for explaining a process for learning the directionality of an antenna beam by the reception beam processing part 282.

With reference to FIG. 9, the exemplary signal format of the beam learning signal S2 is shown again. The beam learning signal S2 is transmitted from the communication apparatus 100 according to the second communication scheme. The beam learning signal S2 includes the (BLF) including the ten time slots T0 to T9 corresponding to the transmission beam patterns Bt0 to Bt9, respectively. The reception beam processing part 282 also divides each of the time slots T0 to T9 of the beam learning signal S2 into ten sections ST0 to ST9. The reception beam processing part 282 performs a weight process on the received signals according to ten different reception beam patterns in the sections ST0 to ST9, respectively. For example, the first section ST0 in the time slot T0 is associated with a reception beam pattern Br0, and the second section ST1 in the time slot T0 is associated with a reception beam pattern Br1. By such a directionality learning process, received signals can be obtained in a beam learning signal. The received signals have been transmitted and received in the total of one hundred transmission and reception beam patterns found by multiplying ten transmission beam patterns by ten reception beam patterns.

The power calculation part 283 calculates each received power of the received signals in response to the instruction from the synchronization part 281. The received signals have been transmitted and received in the above-mentioned total of one hundred transmission and reception patterns. Then, the power calculation part 283 sequentially outputs the calculated received power values to the determination part 284.

The determination part 284 determines, based on the received power value input from the power calculation part 283, a parameter value for specifying the optimal transmission beam pattern and reception beam pattern. The optimal beam pattern is typically a beam pattern where a series of received power values input from the power calculation part 283 becomes the maximum value in a beam learning signal. The parameter value for specifying the optimal transmission beam pattern can be, for example, one of the time slot numbers (T0 to T9) shown in FIG. 9. Alternatively, the parameter value for specifying the optimal transmission beam pattern can be, for example, the weight coefficient by which the transmitted signal is multiplied in the transmission beam processing part 287. Furthermore, the parameter value for specifying the optimal reception beam pattern can be, for example, the section number (ST0 to ST9) shown in FIG. 9. Alternatively, the parameter value for specifying the optimal reception beam pattern can be, for example, the weight coefficient by which each of the received signals is multiplied in the reception beam processing part 282. The determination part 284 outputs the parameter value determined in such a manner to the control part 290.

To obtain a data signal, the demodulation and decode part 285 demodulates and decodes the received signals according to a given modulating scheme and a given encoding scheme that are used for the second communication scheme. The received signals have been weighted by the reception beam processing part 282. Then, the demodulation and decode part 285 outputs the obtained data signal to the control part 290.

To generate a transmitted signal, the encode and modulation part 286 encodes and modulates the data signal input from the control part 290 according to the given encoding scheme and the given modulating scheme that are used for the second communication scheme. Then, the encode and modulation part 286 outputs the generated transmitted signal to the transmission beam processing part 287.

In the same manner as the transmission beam processing part 187, the transmission beam processing part 287 generates, from the transmitted signal input from the encode and modulation part 286, a plurality of transmitted signals that has been weighted, for example, according to a uniform distribution or Taylor distribution, in order to control the directionality of the transmission beam. The value of the weight used by the transmission beam processing part 287 is specified, for example, according to the directionality control signal input from the control part 290. The transmitted signals that have been weighted by the transmission beam processing part 287 are output to the DA conversion part 276, independently.

Although not shown in FIG. 8, note that, in the second digital part 280, the channel characteristic of the MIMO channel is also estimated according to the received signals received by the antennas 260a to 260n, and a channel equalization can be performed according to the estimation result.

Going back to FIG. 7, the description of the exemplary configuration of the communication apparatus 200 will be continued.

For example, the control part 290 controls whole the operations of the second wireless communication part 270, for example, using a calculation device such as a CPU. For example, when instructed from the first wireless communication part 220 to learn the directionality of the beam, the control part 290 makes the second digital part 280 determine the optimal beam pattern using the beam learning signal after the offset T1 has elapsed since the learning instruction signal by the first wireless communication part 220 has been received. Further, when instructed to receive the beacon for wireless communication according to the second communication scheme, the control part 290 makes the second wireless communication part 270 receive the beacon for the wireless communication according to the second communication scheme after the offset T2 has elapsed since the control signal by the first wireless communication part 220 has been received. At that time, the control part 290 outputs, to the reception beam processing part 282, the directionality control signal including the parameter value for specifying the learned optimal reception beam pattern, and forms the reception beam having the directionality in a direction toward the communication apparatus 100. This can cause the communication apparatus 200 to favorably receive the above-mentioned beacon. The information necessary to participate in wireless communication according to the second communication scheme, for example, the system ID and the beacon cycle are included in the beacon.

Also, once the control part 290 have succeeded in the reception of the beacon for the wireless communication according to the second communication scheme, the control part 290 outputs the directionality control signal to the reception beam processing part 282 in order to form a reception beam having the directionality in a direction toward the correspondent in the subsequent wireless communication. The control part 290 can also output the directionality control signal including the same parameter value as the value used for forming the reception beam to the transmission beam processing part 287 in order to form a transmission beam having the directionality in the same direction. This enables a favorable wireless communication according to the second communication scheme, for example, between the communication apparatus 100 and the communication apparatus 200.

When the control part 290 has not normally received a beacon at the timing when the control part 290 has attempted to receive the beacon, the control part 290 can request the communication apparatus 100 through the first wireless communication part 220 to transmit the learning instruction signal for learning the directionality of the beam. This enables a prompt adaption to a change of the positional relationship, for example, due to the movement of the communication apparatus 100 or 200. Note that the case where a beacon has not normally be received can include not only the case where the beacon itself has not be detected but also, for example, the case where the reception (or quality) is at a level lower than expected although the beacon has been detected.

(2-4. Flow of Process)

Figure 10:
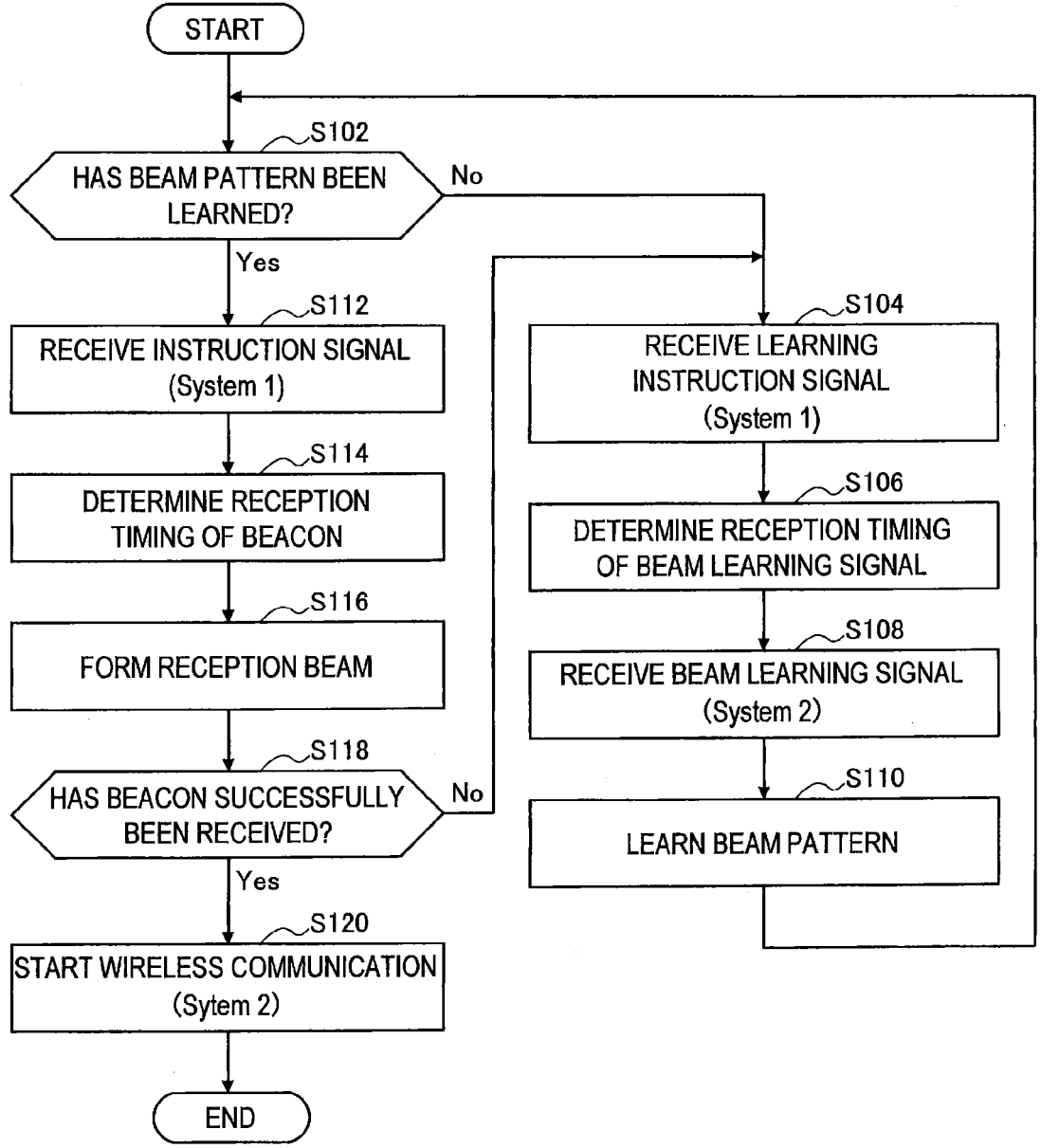
FIG. 10 is a flowchart for showing an exemplary flow of a communication control process according to an embodiment.

FIG. 10 is a flowchart for showing an exemplary flow of a communication control process at the start of wireless communication according to the second communication scheme in the present embodiment. Note that, in FIG. 10, the flow of the process is shown from a viewpoint of the communication apparatus 200 receiving the control signal S3 and the beacon S4 shown in FIG. 6 or, namely, the receiving side.

With reference to FIG. 10, before wireless communication according to the second communication scheme is started, the communication apparatus 200 first determines whether the optimal beam pattern for the communication apparatus 100 that is the correspondent has been learned (step S102). At that time, when the optimal beam pattern has been learned, the process goes to step S112. On the other hand, when the optimal beam pattern has not been learned, the process goes to step S104.

In step S104, the communication apparatus 200 is on standby to receive the learning instruction signal transmitted from the communication apparatus 100 according to the first communication scheme (System 1) (step S104). Then, when the learning instruction signal has been received, the process goes to step S106. Next, the communication apparatus 200 determines the reception timing of the beam learning signal using the temporal difference between the learning instruction signal and the beam learning signal or, namely, the offset T1 (step S106). Next, the communication apparatus 200 receives, at the determined reception timing, the beam learning signal transmitted from the communication apparatus 100 according to the second communication scheme (System 2) (step S108). At that time, the second wireless communication part 270 in the communication apparatus 200 learns the optimal beam pattern between the communication apparatus 100 and the communication apparatus 200 under the directionality learning process shown in FIG. 9 as an example (step S110). The optimal beam pattern learned at that time is stored in the storage part 250 of the communication apparatus 200 and can be notified to the communication apparatus 100. Then, the process goes back to step S102.

When the optimal beam pattern has been learned in step S102, the communication apparatus 200 is on standby to receive the instruction signal transmitted from the communication apparatus 100 according to the first communication scheme (System 1) (step S112). Then, when the instruction signal has been received, the process goes to step S114. Next, the communication apparatus 200 determines the reception timing of the beacon using the temporal difference between the instruction signal and the beacon for the wireless communication according to the second communication scheme or, namely, the offset T2 (step S114). Next, the communication apparatus 200 applies the learned beam pattern to the received signal at the determined reception timing, in other words, forms the reception beam, in order to increase the reach of the wireless signal according to the second communication scheme (step S116). Then, the communication apparatus 200 determines whether the beacon transmitted from the communication apparatus 100 according to the second communication scheme (System 2) has been successfully received (step S118). At that time, when the beacon transmitted from the communication apparatus 100 has not normally been received, the communication apparatus 200 attempts to learn the directionality of the antenna beam again (steps S104 to S110). On the other hand, when the beacon transmitted from the communication apparatus 100 has normally been received, the communication apparatus 200 starts wireless communication according to the second communication scheme that uses the information obtained from the beacon (step S120).

<3. Conclusion>

The embodiment of the present invention has been described using FIGS. 1 to 10 so far. According to the present embodiment, when wireless communication according to the second communication scheme is started, the reception timing of a beacon for the second communication scheme is determined based on the timing when a control signal transmitted according to the first communication scheme has been received. The second communication scheme is a scheme where the communication range is preferably increased by the directionality of the antenna. On the other hand, the first communication scheme is a scheme where a sufficient communication range can be maintained without the directionality. This can form a reception beam at the reception timing when the beacon is expected to reach in the communication apparatus on the receiving side. The reception beam has the directionality that has been learned in advance. Thus, a high-speed wireless communication according to the second communication scheme can flexibly be started even though an antenna beam is not always directed to a specific direction.

Further, according to the present embodiment, the above-mentioned control signal includes the information indicating whether the above-mentioned beacon is transmitted following after the control signal. This extends the existing signal according to the first communication scheme to use the existing signal as the above-mentioned control signal, and can advance the subsequent process only when the wireless communication according to the second communication scheme is required to start.

Further, according to the present embodiment, when the above-mentioned beacon has not normally been received at the reception timing that has been determined using the above-mentioned control signal, the learning of the beam pattern is attempted again. This can automatically recognize the need of the learning of the beam pattern at the time when the communication is needed, and this can promptly learn the beam pattern again, in a case where the communication apparatus is moved after the beam patter has been learned.

Furthermore, according to the present embodiment, the above-mentioned control signal includes an "offset" field that indicates the temporal difference from the time when the control signal is received to the reception timing of the above-mentioned beacon. This enables the communication apparatus on the side transmitting the beacon to actively specify the reception timing of the beacon.

Note that the example where the beam learning signal is divided into as many time slots as the beam patterns has mainly been described herein. However, the beam learning signal is not limited to the example and can be a signal obtained by multiplexing the signal sequence spread by as many spread codes as the beam patterns.

Further, although the communication apparatus 100 has been described as the apparatus on the transmitting side, and the communication apparatus 200 has been described as the apparatus on the receiving side herein, it is needless to say that a communication apparatus that has both of the functions of these two apparatuses can be provided.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Communication system
100 Communication apparatus (Transmitting apparatus)
120 First wireless communication part
170 Second wireless communication part
200 Communication apparatus (Receiving apparatus)
220 First wireless communication part 270 Second wireless communication part
S1 Learning instruction signal
S2 Beam learning signal
S3 Control signal
S4 Beacon (for the second communication scheme)

The invention claimed is:

1. A communication apparatus comprising:
   first circuitry configured to perform wireless communication according to a first communication scheme; and
   second circuitry configured to perform wireless communication according to a second communication scheme that uses a higher frequency band than the first communication scheme, wherein
   the second circuitry determines a reception timing to receive a first signal transmitted according to the second communication scheme based on an offset time indicated in a specific field of a second signal received by the first circuitry, and forms, at the determined reception timing, a reception beam having a directionality learned in advance, and
   the offset time indicated by the specific field of the second signal corresponds to a time difference from an end of receiving the second signal by the first circuitry to a start of receiving the first signal by the second circuitry.

2. The communication apparatus according to claim 1, wherein the second signal includes information indicating whether the first signal is transmitted following the second signal.

3. The communication apparatus according to claim 2, wherein,
   when the first signal has not normally been received at the determined reception timing, the second circuitry attempts to learn the directionality of the reception beam again.

4. The communication apparatus according to claim 3, wherein the second circuitry determines, as the determined reception timing of the first signal, a timing when the time difference has elapsed since the first circuitry has received the second signal.

5. A communication control method between a transmitting apparatus and a receiving apparatus capable of performing wireless communication according to a first communication scheme and a second communication scheme that uses a higher frequency band than the first communication scheme, respectively, the method comprising:
   transmitting a first signal from the transmitting apparatus to the receiving apparatus according to the first communication scheme;
   determining a reception timing to receive a second signal transmitted according to the second communication scheme in the receiving apparatus based on an offset time indicated in a specific field of the first signal, the offset time corresponding to a time difference from an end of receiving the first signal to a start of receiving the second signal by the receiving apparatus;
   transmitting the first signal from the transmitting apparatus to the receiving apparatus according to the second communication scheme; and
   receiving the second signal transmitted from the transmitting apparatus by forming, at the determined reception timing in the receiving apparatus, a reception beam having a directionality learned in advance.

6. A communication system including a transmitting apparatus and a receiving apparatus each comprising:
   first circuitry configured to perform wireless communication according to a first communication scheme; and
   second circuitry configured to perform wireless communication according to a second communication scheme that uses a higher frequency band than the first communication scheme, wherein
   the first circuitry in the transmitting apparatus transmits a first signal to the receiving apparatus according to the first communication scheme,
   the second circuitry in the receiving apparatus determines a reception timing to receive a second signal transmitted according to the second communication scheme based on an offset time indicated in a specific field of the first signal, the offset time corresponding to a time difference from an end of receiving the first signal to a start of receiving the second signal by the receiving apparatus,
   the second circuitry in the transmitting apparatus transmits the second signal to the receiving apparatus according to the second communication scheme, and
   the second circuitry in the receiving apparatus receives the second signal transmitted from the transmitting apparatus by forming, at the determined reception timing, a reception beam having a directionality learned in advance.

* * * * *